United States Patent
Lee et al.

(10) Patent No.: US 9,268,981 B2
(45) Date of Patent: *Feb. 23, 2016

(54) SYSTEMS AND METHODS FOR JOINT BEAMFORMING AND PREAMBLE DETECTION

(71) Applicant: Mojix, Inc., Los Angeles, CA (US)

(72) Inventors: Dong-U Lee, Los Angeles, CA (US); Christopher R. Jones, Pacific Palisades, CA (US)

(73) Assignee: Mojix, Inc., Los Angeles, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/575,975

(22) Filed: Dec. 18, 2014

(65) Prior Publication Data

US 2015/0102912 A1 Apr. 16, 2015

Related U.S. Application Data

(63) Continuation of application No. 13/307,819, filed on Nov. 30, 2011, now Pat. No. 8,929,494.

(60) Provisional application No. 61/418,120, filed on Nov. 30, 2010.

(51) Int. Cl.
*H04B 1/10* (2006.01)
*G06K 7/10* (2006.01)

(52) U.S. Cl.
CPC .................. *G06K 7/10356* (2013.01)

(58) Field of Classification Search
CPC ....... H01Q 1/2216; G01S 13/878; G01S 5/74; G01S 3/74; G01S 5/04; G01S 5/12; H04B 2001/00

USPC ................ 375/140–145, 147–153, 316, 340, 375/342–343, 346–350

See application file for complete search history.

(56) References Cited

U.S. PATENT DOCUMENTS

| | | | |
|---|---|---|---|
| 6,127,981 | A | 10/2000 | Pritchett et al. |
| 6,184,841 | B1 | 2/2001 | Shober et al. |
| 6,396,438 | B1 | 5/2002 | Seal |
| 6,903,656 | B1 | 6/2005 | Lee |
| 6,982,670 | B2 | 1/2006 | Mohamadi |
| 7,002,461 | B2 | 2/2006 | Duncan et al. |
| 7,212,116 | B2 | 5/2007 | Wang et al |
| 7,432,855 | B2 | 10/2008 | Mohamadi |
| 7,432,874 | B2 | 10/2008 | Meissner |

(Continued)

*Primary Examiner* — James M Perez
(74) *Attorney, Agent, or Firm* — KPPB LLP

(57) ABSTRACT

Systems and methods for reading RFID tags using joint beamforming and preamble detection in accordance with embodiments of the invention are disclosed. One embodiment includes an antenna array comprising a plurality of antenna elements, a joint beamformer and preamble detector configured to receive inputs from each of the antenna elements, and a decoder configured to receive a resampled signal from the joint beamformer and preamble detector and to decode data using the resampled signal. In addition, the joint beamformer and preamble detector is configured to correlate the inputs from the antenna elements against a correlation sequence at a plurality of starting sample positions and predetermined rates, use the correlations to select a starting sample position and rate for decoding the received signal, use the correlations to determine beamforming coefficients for combining the inputs, and resample the combined inputs based upon the selected starting sample position and rate.

14 Claims, 6 Drawing Sheets

(56) References Cited

U.S. PATENT DOCUMENTS

| | | |
|---|---|---|
| 7,561,053 B2 | 7/2009 | Hecht et al. |
| 7,633,377 B2 | 12/2009 | Sadr |
| 7,652,577 B1 | 1/2010 | Madhow et al. |
| 7,667,652 B2 | 2/2010 | Gevargiz et al. |
| 8,325,014 B1 | 12/2012 | Sundstrom et al. |
| 8,395,482 B2 | 3/2013 | Sadr et al. |
| 8,929,494 B2 * | 1/2015 | Lee et al. .................. 375/349 |
| 2005/0237953 A1 | 10/2005 | Carrender et al. |
| 2006/0117066 A1 | 6/2006 | Smith et al. |
| 2006/0279458 A1 | 12/2006 | Mohamadi |
| 2007/0025475 A1 | 2/2007 | Okunev |
| 2007/0069864 A1 | 3/2007 | Bae et al. |
| 2007/0096873 A1 | 5/2007 | Sadr |
| 2008/0012710 A1 | 1/2008 | Sadr |
| 2008/0030422 A1 * | 2/2008 | Gevargiz et al. ..... H01Q 1/2216 343/860 |
| 2008/0042847 A1 | 2/2008 | Hollister et al. |
| 2009/0146792 A1 | 6/2009 | Sadr et al. |
| 2010/0026496 A1 * | 2/2010 | Martens et al. ......... H04L 7/042 340/572.1 |
| 2010/0039228 A1 | 2/2010 | Sadr et al. |
| 2012/0188058 A1 | 7/2012 | Lee et al. |

* cited by examiner

SYSTEMS AND METHODS FOR JOINT BEAMFORMING AND PREAMBLE DETECTION

CROSS-REFERENCE TO RELATED APPLICATIONS

The present application claims priority under 35 U.S.C. 120 as a continuation of application Ser. No. 13/307,819, entitled Systems and Methods for Joint Beamforming and Preamble Detection, filed Nov. 30, 2011, which claims priority under 35 U.S.C. 119(e) to U.S. Provisional Patent Application No. 61/418,120, entitled Preformer: Joint Beamforming and Preamble Detection, filed Nov. 30, 2010, the disclosures of which are incorporated herein by reference in their entireties.

FIELD OF THE INVENTION

The present invention relates to Radio Frequency Identification (RFID) systems and more specifically to beamforming and preamble detection in RFID systems that include antenna arrays.

BACKGROUND

The term Radio Frequency Identification (RFID) is typically used to refer to a technology that uses radio waves to transfer data from an electronic tag, commonly referred to as RFID tag or transponder, to a reader for the purpose of identifying and tracking an object to which the RFID tag is affixed. The RFID tag's information is stored electronically and the RFID tag includes a small RF transmitter and receiver. An RFID reader transmits an encoded radio signal to interrogate the RFID tag. The RFID tag receives the message and responds with its identification information. A class of RFID tag referred to as passive RFID tags does not use a battery. Instead, a passive RFID tag harvests energy from the transmitted RF interrogation signal and uses the harvested energy to power its electronics. RFID tags that include batteries are typically referred to as active RFID tags.

A number of organizations have established standards for RFID systems including the UHF Class 1 Gen 2 Standard developed by EPCglobal Inc., which is commonly referred to as the EPCglobal Gen 2 standard and defines the physical and logical requirements for a passive-backscatter, interrogator-talks-first (ITF), radio-frequency identification (RFID) system operating in the 860 MHz-960 MHz frequency range. The EPCglobal Gen 2 standard specifies that RFID tag backscatter can use Amplitude Shift Keying (ASK) and/or Phase Shift Keying (PSK) modulation. In addition, the standard requires RFID tags to encode data using FM0 (bi-phase space) baseband or Miller modulation of a subcarrier at the data rate. Under the standard, the reader specifies the encoding to be used by the RFID tag.

FM0 encoding inverts the baseband phase at every symbol boundary. A data 0 has an additional mid-symbol phase inversion. The EPCglobal Gen 2 standard specifies that FM0 signaling shall begin with one of a standard or an extended preamble (specified by the reader). The preambles differ in that the extended preamble (TRext=1) includes the six preamble symbols of the standard preamble (TRext=0) with a pilot tone of 12 leading zeros.

Baseband Miller encoding inverts its phase between two data-0s in sequence. Baseband Miller encoding also places a phase inversion in the middle of a data-1 symbol. The Miller-modulated subcarrier sequences contain two, four, or eight subcarrier cycles per bit, depending on the M value specified by the reader. As with FM0 signaling, the EPCglobal Gen 2 standard specifies that Miller-modulated subcarrier signaling begin with either a standard or an extended preamble. The standard preamble includes a pilot tone having a duration of 4 symbol periods and the extended preamble includes a pilot tone with an additional duration of 12 symbol periods.

SUMMARY OF THE INVENTION

Systems and methods in accordance with embodiments of the invention read RFID tags using joint beamforming and preamble detection. One embodiment includes an antenna array comprising a plurality of antenna elements, a joint beamformer and preamble detector configured to receive inputs from each of the plurality of antenna elements, and a decoder configured to receive the resampled signal from the joint beamformer and preamble detector and to decode data using the resampled signal. In addition, the joint beamformer and preamble detector is configured to correlate the inputs from the plurality of antenna elements against a correlation sequence at a plurality of starting sample positions and a plurality of predetermined rates, use the correlations to select a starting sample position and rate for decoding the received signal, use the correlations to determine beamforming coefficients for combining the inputs from each of the plurality of antenna elements, and resample the combined inputs from each of the plurality of antenna elements based upon the selected starting sample position and rate.

In a further embodiment, the RFID reader system comprises a plurality of exciters and an RFID receiver system including the antenna array, the joint beamformer and preamble detector and the decoder.

In another embodiment, the joint former and preamble detector comprises a skipping based correlator configured to correlate the inputs from the plurality of antenna elements against a correlation sequence at a plurality of starting sample positions and plurality of predetermined rates.

In a still further embodiment, the skipping based correlator comprises a symbol accumulator circuit and a tapped delay line, and correlations for different starting sample positions and rates can be determined using the outputs of different taps from the tapped delay line.

In still another embodiment, the inputs from each of the plurality of antenna elements comprises samples of the in-phase and quadrature channels of each antenna element.

In a yet further embodiment, the joint beamformer and preamble detector is configured to use the complex correlations of each of the antenna elements at the selected starting sample and rate to determine the beamforming coefficients.

In yet another embodiment, the joint beamformer and preamble detector is configured to determine the complex beamforming coefficient ($b_i$) of an antenna element i in an array of n antenna elements can be generated as follows:

$$b_i = \frac{c_i}{\max|c_o, \ldots, c_{n-1}|}$$

where $c_i$ is the complex correlation value of channel/at the selected starting sample position and rate.

In a further embodiment again, the RFID reader system is configured to request data from an RFID tag encoded using FM0 modulation (TRext=1).

In another embodiment again, the correlation sequence includes 12 pilot symbols and 6 preamble symbols of an FM0 modulated pilto and preamble (TRext=1) in accordance with the EPCglobal Gen 2 specification.

In a further additional embodiment, the RFID reader system is configured to request data from an RFID tag encoded using Miller-2 modulation (TRext=0).

In another additional embodiment, the correlation sequence corresponds to the latter 20 FM0 symbols of a Miller-2 modulated pilot and preamble (TRext=0) in accordance with the EPCglobal Gen 2 specification.

In a still yet further embodiment, the RFID reader system is configured to request data from an RFID tag encoded using Miller-4 modulation (TRext=0).

In still yet another embodiment, the correlation sequence corresponds to the latter 40 FM0 symbols of a Miller-4 modulated pilot and preamble (TRext=0) in accordance with the EPCglobal Gen 2 specification.

In a still further embodiment again, the RFID reader system is configured to request data from an RFID tag encoded using Miller-8 modulation (TRext=0).

In still another embodiment again, the correlation sequence corresponds to the latter 48 FM0 symbols of a Miller-8 modulated pilot and preamble (TRext=0) in accordance with the EPCglobal Gen 2 specification.

An embodiment of the method of the invention includes receiving sampled streams from each antenna element in the antenna array using the RFID receiver, correlating each stream against a predetermined correlation sequence for each of a plurality of possible starting samples and at each of a plurality of predetermined rates using the joint beamformer and preamble detector, summing the magnitude of the correlation value of each sample position and rate across each of the antenna streams using the joint beamformer and preamble detector, selecting the sample position and rate having the highest sum of correlation value magnitudes using the joint beamformer and preamble detector, determining beamforming coefficients based on the correlations of each stream at the selected sample position using the joint beamformer and preamble detector, combining the antenna outputs based upon the beamforming coefficients using the joint beamformer and preamble detector, resampling the combined antenna outputs based upon the selected starting sample and rate using the joint beamformer and preamble detector to produce a resampled signal, and decoding the transmitted data based upon the resampled signal using the RFID receiver.

DETAILED DESCRIPTION

Turning now to the drawings, systems and methods for reading RFID tags using joint beamforming and preamble detection in accordance with embodiments of the invention are illustrated. In many embodiments, an RFID reader system includes an antenna array and utilizes adaptive beamforming to achieve increased sensitivity to signals transmitted by RFID tags. Instead of conducting beamforming and preamble detection independently in a serial manner, RFID reader systems in accordance with embodiments of the invention perform joint beamforming and preamble detection. In several embodiments, preamble detection is performed on the outputs of each of the antenna elements, which finds the best starting sample and data rate for decoding the received data and generates the beamforming coefficient for combining the outputs of the antenna elements. In this way, both beamforming and preamble detection can be performed using a single correlation process instead of the two correlations processes typically utilized when beamforming and preamble detection are performed independently. In a number of embodiments, a "skipping" based correlator is utilized to perform joint beamforming and preamble detection. Instead of interpolating, which utilizes multipliers, a skipping based correlator achieves fine rate correlations by skipping samples.

RFID reader systems that perform joint beamforming and preamble detection in accordance with embodiments of the invention can provide reduced latency and increased performance relative to a system that performs beamforming and preamble detection independently. In addition, the use of skipping based correlators can reduce the complexity of an RFID reader system's implementation. RFID reader systems that perform joint beamforming and preamble detection in accordance with embodiments of the invention are discussed further below.

RFID Reader Systems

A variety of RFID reader system configurations including antenna arrays can utilize joint beamformer and preamble detectors in accordance with embodiments of the invention including systems in which the RFID reader system includes a single reader that both generates interrogation signals and receives backscattered information from RFID tags and distributed RFID reader systems where a set of exciters generate interrogation signals and an RFID receiver receives backscattered information from RFID tags. Both RFID reader system configurations are disclosed in U.S. Pat. No. 7,633,377 entitled "RFID Receiver" to Sadr and U.S. patent application Ser. No. 12/054,331 entitled "RFID Systems Using Distributed Exciter Network" to Sadr et al. The disclosures of U.S. Pat. No. 7,633,377 and U.S. patent application Ser. No. 12/054,331 are incorporated by reference herein in their entirety.

Figure 1:
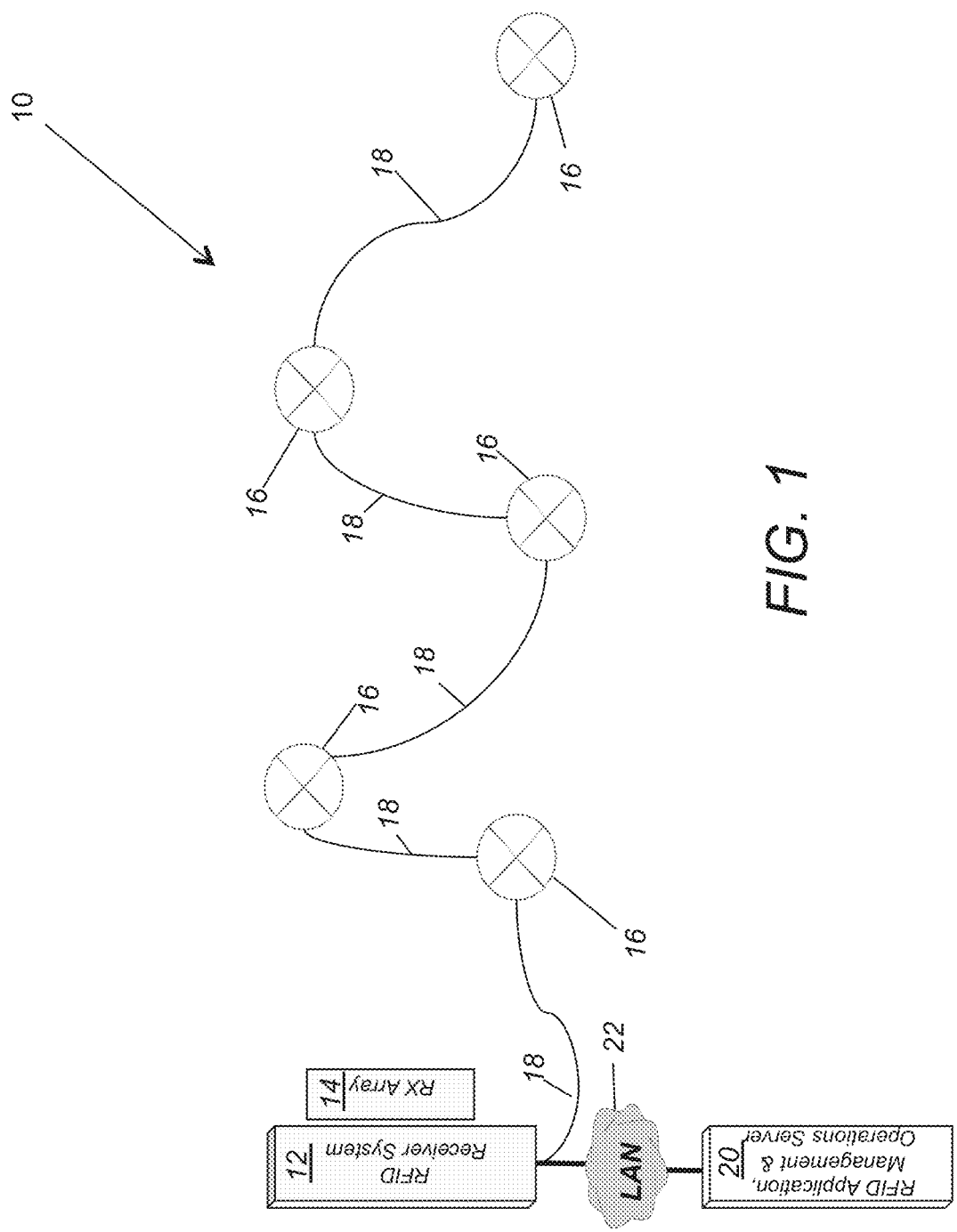
FIG. 1 conceptually illustrates an RFID reader system including a distributed exciter architecture and an RFID receiver system including a receiver antenna array in accordance with an embodiment of the invention.

An RFID reader system including a distributed exciter architecture in accordance with an embodiment of the invention is shown in FIG. 1. The RFID reader system 10 includes an RFID receiver system 12 connected to an antenna array 14 and a plurality of exciters 16 that are daisy chained to the RFID receiver system via cables 18. The RFID receiver system is also connected to an RFID application server 20 via a network 22. Although the plurality of exciters are shown as wired, in many embodiments exciters communicate wirelessly with the RFID receiver system.

In operation, the RFID receiver system 12 controls the activation of exciters. The cable segments 18 carry both direct current (DC) power and control commands from the RFID receiver system 12 to each exciter 16. The transmitted "backhaul signal" from the RFID receiver system 12 to the exciters embeds all the necessary signal characteristics and parameters to generate a desired waveform output form the exciter module to an RFID tag. The exciters 16 can be operated sequentially or concurrently, depending on the number of possible beams the RFID receiver system can support. In the illustrated embodiment, the RFID receiver system 12 includes a single antenna array 14 and is capable of generating a single beam. In other embodiments, the RFID receiver system includes multiple antenna arrays and is capable of generating multiple beams.

The RFID receiver system 12 receives data backscattered by RFID tags using the antenna array 14. In order to extract data from the backscattered signal, the RFID receiver system utilizes beamforming to increase the signal to noise ratio of the received signal. The RFID receiver also performs preamble detection to determine the data rate of the backscattered transmission and to locate the best starting sample for decoding the packet of data within the backscattered transmission. The data rate of RFID tags can vary considerably. For example, RFID tags manufactured in accordance with the EPCglobal Gen 2 specification can include rate variations of ±15%. Therefore, accurate preamble detection can significantly improve decoder performance. RFID receiver systems in accordance with embodiments of the invention perform joint beamforming and preamble detection, which involves performing preamble detection on each of the antenna outputs to identify the best rate and starting sample and using the information generated during the preamble detection to determine the beamforming coefficients. Although a specific RFID reader system configuration is illustrated in FIG. 1, any of a variety of RFID reader system configurations can be utilized involving receiving backscattered signals using an antenna array including (but not limited) to an RFID reader system in which the reader also generates interrogation signals in accordance with embodiments of the invention. Systems and methods for reading data transformed by RFID tags using joint beamforming and preamble detection in accordance with embodiments of the invention are discussed further below.

RFID Receiver Systems

Figure 2:
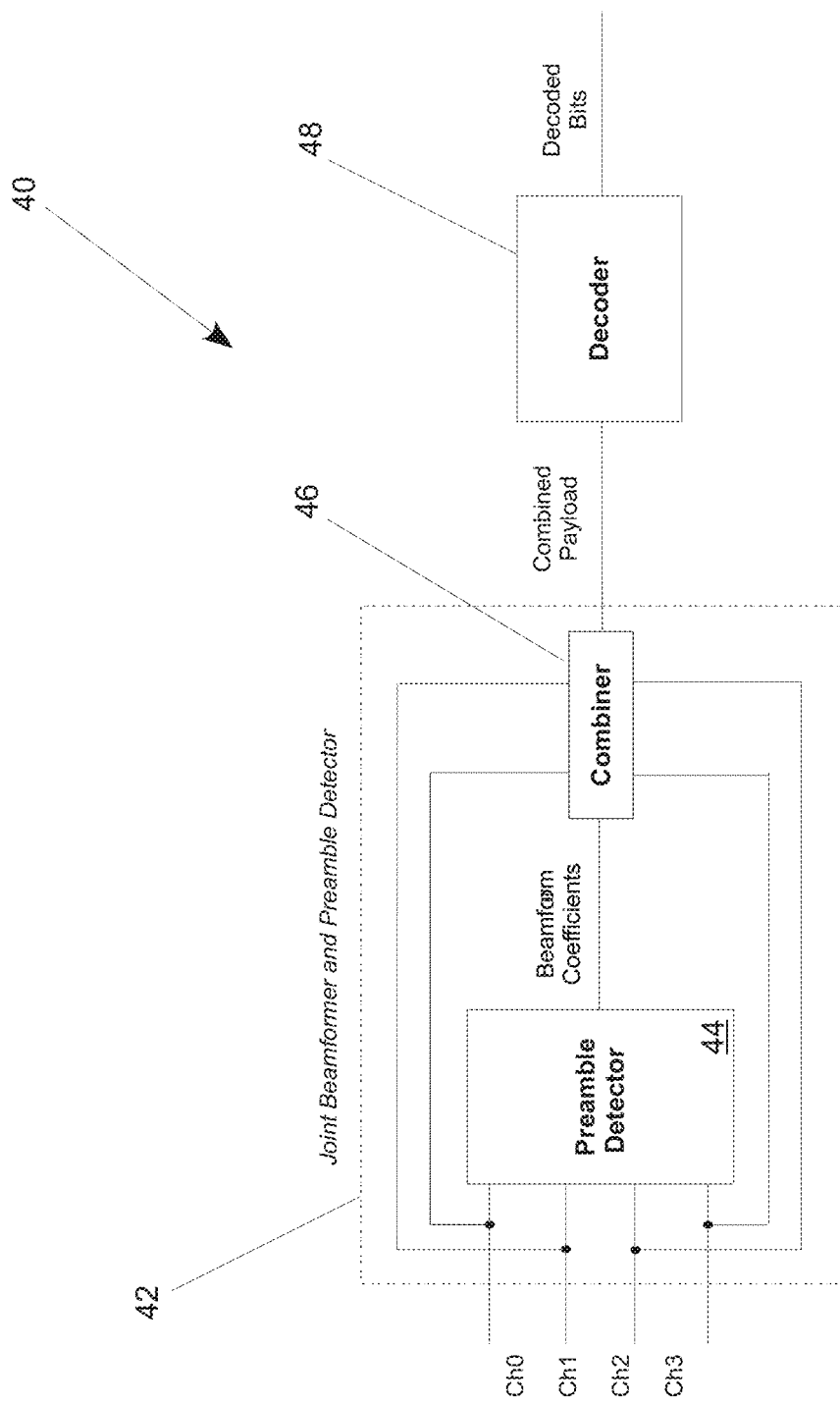
FIG. 2. conceptually illustrates an RFID receiver system including a joint beamformer and preamble detector in accordance with an embodiment of the invention.

A joint beamformer and preamble detector can be incorporated into a variety of RFID reader systems that include antenna arrays in accordance with embodiments of the invention. An RFID receiver system configured to decode data modulated onto signals backscattered by RFID tags using a joint beamformer and preamble detector in accordance with an embodiment of the invention is illustrated in FIG. 2. The RFID receiver system 40 includes a joint beamformer and preamble detector 42 that receives as inputs the complex in-phase and quadrature (I/Q) channels of each antenna element in the antenna array. In the illustrated embodiment, the antenna array includes four antenna elements. In other embodiments, any number of antenna array inputs can be processed by a joint beamformer and preamble detector in accordance with an embodiment of the invention.

The joint beamformer and preamble detector 42 includes a preamble detector 44, which performs preamble detection on all of the complex I/Q channels received from the antenna array. In the process, the preamble detector 44 determines the beamforming coefficients for combining each of the I/Q channels. In many embodiments, the preamble detector 44 computes the correlation magnitude for different rates and sample positions for each I and Q channel. The correlation magnitudes for each sample position and rate are summed across all of the I and Q channels and the sample position and rate that gives the highest sum of correlation magnitudes is chosen as the best starting sample and data rate for decoding the transmitted packet. The correlations generated for each complex I/Q channel can then be utilized to generate the beamforming coefficients (see discussion below). The beamforming coefficients generated by the preamble detector 44 are provided to a combiner 46 and the combined signal is resampled based upon the starting sample and data rate determined by the preamble detector are provided to a decoder 48 to decode the modulated data.

Although a specific RFID reader system is illustrated in FIG. 2, any of a variety of RFID reader systems incorporating a joint beamformer and preamble detector can be utilized in accordance with embodiments of the invention. Joint beamformer and preamble detectors in accordance with embodiments of the invention are discussed further below.

Joint Beamformer and Preamble Detectors

Figure 3:
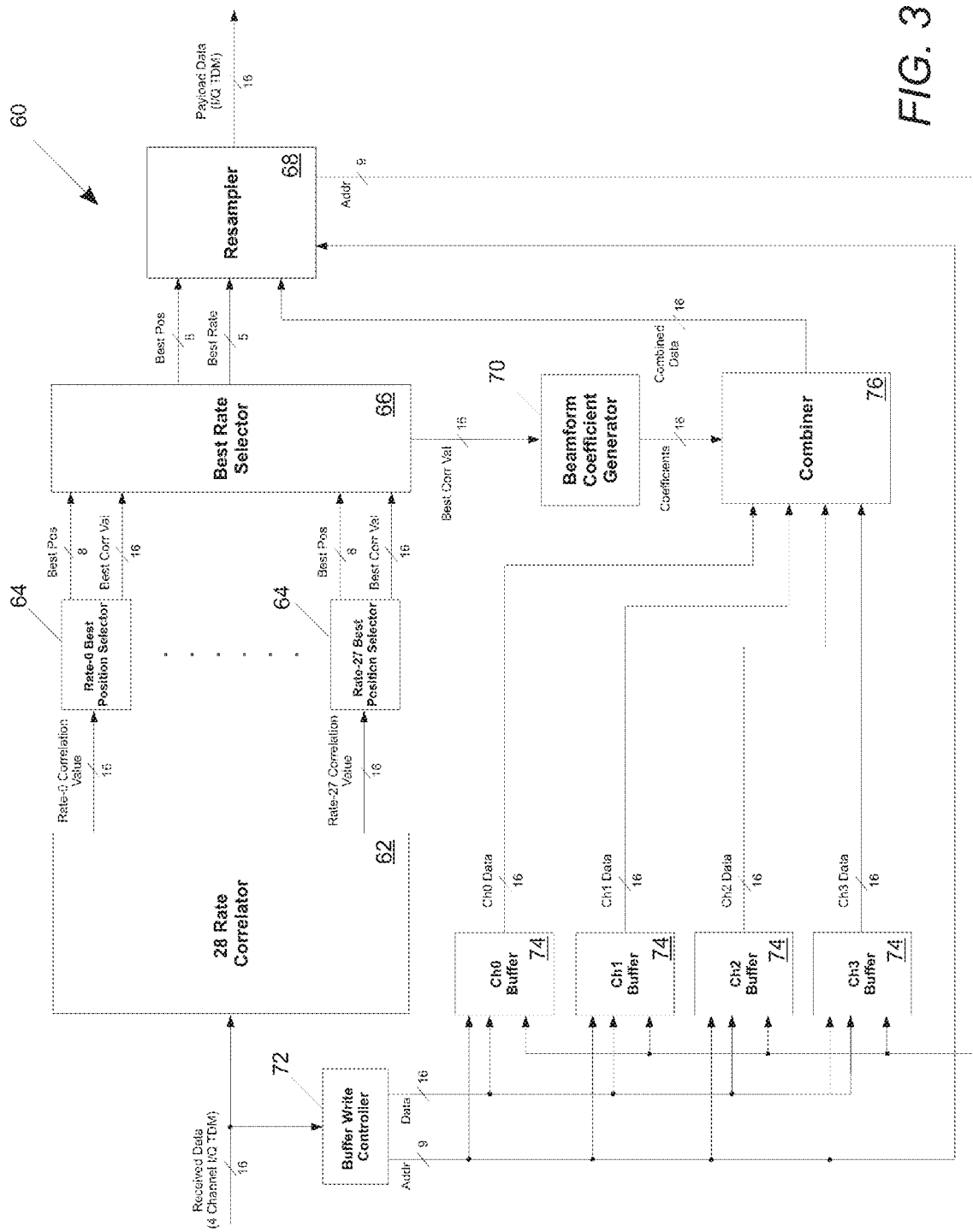
FIG. 3 is a block circuit diagram illustrating a joint beamformer and preamble detector configured to receive inputs from an antenna array including four antenna elements in accordance with an embodiment of the invention.

Joint beamformer and preamble detectors in accordance with many embodiments of the invention utilize a single correlation process to both identify the best starting sample and data rate for the data backscattered by the RFID tag and determine the beamforming coefficients. A joint beamformer and preamble detector configured to receive complex I/Q inputs from four antenna elements in accordance with an embodiment of the invention is illustrated in FIG. 3. The joint beamformer and preamble detector 60 receives incoming streams from each antenna element in the antenna array. In the illustrated embodiment, the incoming data is sampled using a 16-bit analog to digital converter at 78.125 MHz with the 8 streams (i.e. 4 complex I/Q channels) time multiplexed. In other embodiments the number of incoming channels and the sampling rate of the incoming data can be determined as appropriate to the requirements of a specific application.

The incoming data is provided to a number of rate correlators 62, which computes the correlation values for different sample positions and different data rates using a correlation sequence that is chosen based upon the pilot and/or preamble symbols transmitted by an RFID tag. In the illustrated embodiment, the rate correlator correlates the input against 28 rates that cover the ±15% variation in the data rate allowed within the EPCglobal Gen 2 specification. In other embodiments, any number of rates appropriate to the requirements of a specific application can be utilized. Implementation of rate correlators in accordance with embodiments of the invention is discussed further below.

The correlator 62 output at each of the rates is provided to circuitry 64 that selects the best position and correlation value for each rate. The best position and correlation value for each rate is provided to a best rate selector 66. The best rate selector is circuitry configured to use the best correlation value at each rate to select the overall best starting sample and data rate. The best starting sample and data rate is provided to a resampler 68 to enable resampling of the combined data output generated by the adaptive beamforming circuitry within the joint beamformer and preamble detector (see discussion below). The best rate selector 66 also provides the best correlation values for each channel to a beamform coefficient generator 70. The beamform coefficient generator generates the complex beamforming coefficients.

The complex beamforming coefficient ($b_i$) of an antenna element output i in an array of n antenna elements can be generated as follows:

$$b_i = \frac{c_i}{\max|c_o, \ldots, c_{n-1}|}$$

where $c_i$ is the complex correlation value of channel i.

The beamforming coefficients are utilized to perform adaptive beamforming on the antenna inputs. The incoming data for each channel is provided to a buffer write controller 72, which writes the data for each complex channel to a separate buffer 74. A combiner 76 performs complex multiplication with the buffered data and the corresponding beamforming coefficients. The combined data is then resampled using the best sample position and rate information determined by the best rate selector 66 and the payload data provided to a decoder. In a number of embodiments, the resampling is performed using linear interpolation. In other embodiments, any of a variety of resampling processes appropriate to a specific application can be utilized in accordance with embodiments of the invention.

Although a specific joint beamformer and preamble detector is illustrated in FIG. 3, any of a variety of joint beamformer and preamble detector implementations that determine the correlation of input data with different rates and generate beamforming coefficients utilized to combine the input data can be utilized in accordance with embodiments of the invention. In the embodiment illustrated in FIG. 3, the buffer write controller 72, buffers 74, combiner 76, beamform coefficient generator 70 and resampler 68 can all be implemented in a manner similar to the manner in which the equivalent components are implemented in a conventional adaptive beamformer. In addition, the best position selectors 64 and the best rate selector 66 can also be implemented in a similar manner to the manner in which they are implemented in a conventional preamble detector. The implementation of rate correlators in accordance with embodiments of the invention are discussed further below.

Skipping Based Rate Correlators

The core of the joint beamformer and preamble detector is a rate correlator, which is capable of handling the extreme rate variations experienced in RFID systems. Conventionally, correlators are designed using interpolators. The incoming stream is interpolated for different rates and correlation is performed on each of the interpolated streams. Interpolation, however, can be expensive to implement using devices such as Field Programmable Gate Arrays (FPGAs) due to the use of multipliers. For example, a preamble detector operating on four complex channels can involve a correlator including 224 multipliers to achieve 28 rates across the ±15% rate variation experienced when using EPCglobal Gen 2 compliant RFID tags.

Figure 4:
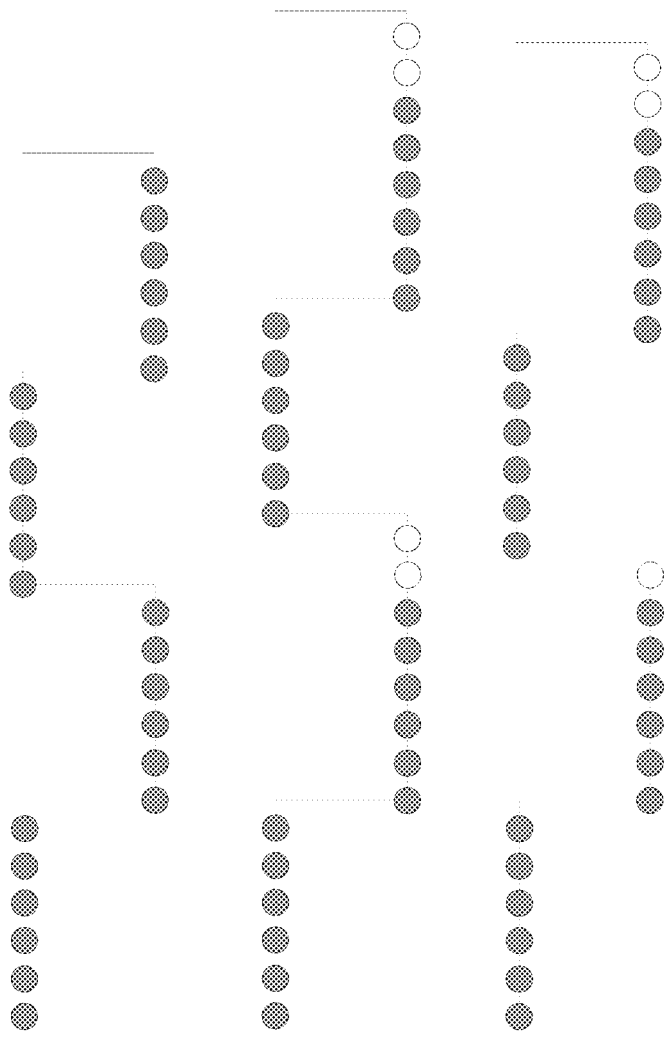
FIGS. 4A-4C conceptually illustrate skipping based correlation in accordance with embodiments of the invention.

In a number of embodiments of the invention, a "skipping" correlator is utilized to perform the rate correlations. A skipping correlator achieves different rates by skipping samples when performing correlation. The concepts underlying a skipping correlator are illustrated in FIGS. 4A-4C. In the first example shown in FIG. 4A, 12 samples are correlated per symbol at a first rate equal to the sampling rate. In the second example shown in FIG. 4B, two samples are skipped between each symbol resulting in a correlation for a second slower rate. The third example illustrated in FIG. 4C performs a correlation at a rate between the first rate and the second rate by skipping one sample in one symbol and two samples in the next symbol. Using different combinations of sample skipping across multiple symbols, very fine rate correlations are achievable.

The following table shows a skipping scheme that can be used in a skipping correlator configured to be utilized in a joint beamformer and preamble detector similar to the one illustrated in FIG. 3. As noted above, 28 rate correlators cover the ±15% rate variation. Each rate correlator correlates 12 samples per FM0 symbol with a different number of samples skipped after each symbol, as indicated in the second column. The skipping sequence simply repeats every six symbols. The time and frequency variations are computed knowing that the nominal rate, i.e. rate variation of 0%, has $16*(125/128)^2$ samples per symbol.

TABLE 1

Skipping sequences used for different rate correlators.

| Rate Index | Skipping | Time Variation (%) | Time Variation Delta (%) | Frequency Variation (%) | Frequency Variation Delta (%) |
|---|---|---|---|---|---|
| 0 | 1, 1, 1, 1, 2, 2 | −12.62 | N/A | 14.44 | N/A |
| 1 | 1, 1, 1, 2, 2, 2 | −11.53 | 1.09 | 13.03 | 1.41 |
| 2 | 1, 1, 2, 2, 2, 2 | −10.43 | 1.09 | 11.65 | 1.38 |
| 3 | 1, 2, 2, 2, 2, 2 | −9.34 | 1.09 | 10.30 | 1.35 |
| 4 | 2, 2, 2, 2, 2, 2 | −8.25 | 1.09 | 8.99 | 1.31 |
| 5 | 2, 2, 2, 2, 2, 3 | −7.16 | 1.09 | 7.71 | 1.28 |
| 6 | 2, 2, 2, 2, 3, 3 | −6.07 | 1.09 | 6.46 | 1.25 |
| 7 | 2, 2, 2, 3, 3, 3 | −4.97 | 1.09 | 5.23 | 1.22 |
| 8 | 2, 2, 3, 3, 3, 3 | −3.88 | 1.09 | 4.04 | 1.20 |
| 9 | 2, 3, 3, 3, 3, 3 | −2.79 | 1.09 | 2.87 | 1.17 |
| 10 | 3, 3, 3, 3, 3, 3 | −1.70 | 1.09 | 1.72 | 1.14 |
| 11 | 3, 3, 3, 3, 3, 4 | −0.60 | 1.09 | 0.61 | 1.12 |
| 12 | 3, 3, 3, 3, 4, 4 | 0.49 | 1.09 | −0.49 | 1.09 |
| 13 | 3, 3, 3, 4, 4, 4 | 1.58 | 1.09 | −1.56 | 1.07 |
| 14 | 3, 3, 4, 4, 4, 4 | 2.67 | 1.09 | −2.60 | 1.05 |
| 15 | 3, 4, 4, 4, 4, 4 | 3.77 | 1.09 | −3.63 | 1.03 |
| 16 | 4, 4, 4, 4, 4, 4 | 4.86 | 1.09 | −4.63 | 1.00 |
| 17 | 4, 4, 4, 4, 4, 5 | 5.95 | 1.09 | −5.62 | 0.98 |
| 18 | 4, 4, 4, 4, 5, 5 | 7.04 | 1.09 | −6.58 | 0.96 |
| 19 | 4, 4, 4, 5, 5, 5 | 8.13 | 1.09 | −7.52 | 0.94 |
| 20 | 4, 4, 5, 5, 5, 5 | 9.23 | 1.09 | −8.45 | 0.92 |
| 21 | 4, 5, 5, 5, 5, 5 | 10.32 | 1.09 | −9.35 | 0.91 |
| 22 | 5, 5, 5, 5, 5, 5 | 11.41 | 1.09 | −10.24 | 0.89 |
| 23 | 5, 5, 5, 5, 5, 6 | 12.50 | 1.09 | −11.11 | 0.87 |
| 24 | 5, 5, 5, 5, 6, 6 | 13.60 | 1.09 | −11.97 | 0.85 |
| 25 | 5, 5, 5, 6, 6, 6 | 14.69 | 1.09 | −12.81 | 0.84 |
| 26 | 5, 5, 6, 6, 6, 6 | 15.78 | 1.09 | −13.63 | 0.82 |
| 27 | 5, 6, 6, 6, 6, 6 | 16.87 | 1.09 | −14.44 | 0.81 |

Although specific skipping based rate correlators are discussed above, any correlator including an interpolation based correlator can be utilized as appropriate to the requirements of a specific application in accordance with embodiments of the invention. The use of the skipping correlator discussed above in joint beamforming and preamble detection of data encoded in accordance with the EPCglobal Gen 2 specification is discussed further below.

Correlation Sequences for EPC

The EPCglobal Gen 2 specification enables an RFID reader system to specify the encoding utilized by an RFID tag. A rate correlator in a joint beamformer and preamble detector of an RFID reader system in accordance with embodiments of the invention can utilize the 12 pilot symbols and 6 preamble symbols of an FM0 modulated transmission (TRext=1) as the correlation sequence. In many embodiments, TRext=0 is used for Miller encoded transmissions. For Miller-2, the rate correlator utilizes the portion of the Miller-2 pilot and preamble that corresponds to the latter 20 FM0 symbols as the correlation sequence. Similarly, the portion of the Miller-4 pilot and preamble corresponding to the latter 40 FM0 symbols can be utilized as the correlation sequence and the portion of the Miller-8 pilot and preamble corresponding to the latter 48 FM0 symbols can be utilized as the correlation sequence. Although specific portions of the pilot and preamble are indicated above, any portion appropriate to a specific application can be utilized by a rate correlator as a correlation sequence in accordance with embodiments of the invention.

Figure 5:
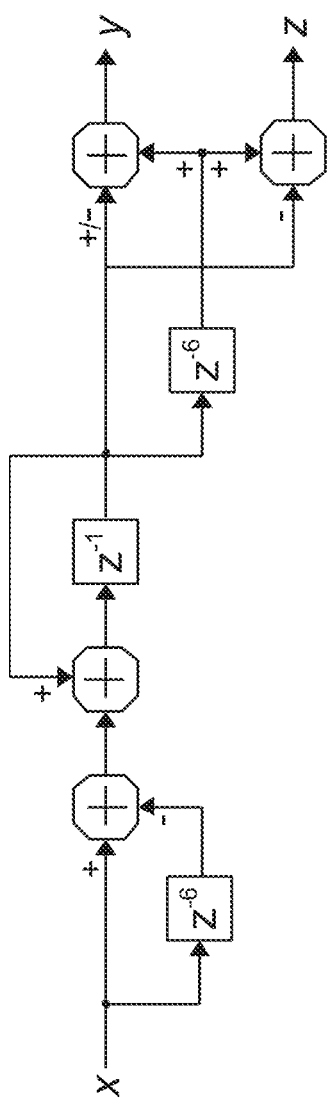
FIG. 5 is a circuit diagram illustrating a circuit configured to accumulate FM0 data-0 and data-1 values in accordance with embodiments of the invention.
Figure 6:
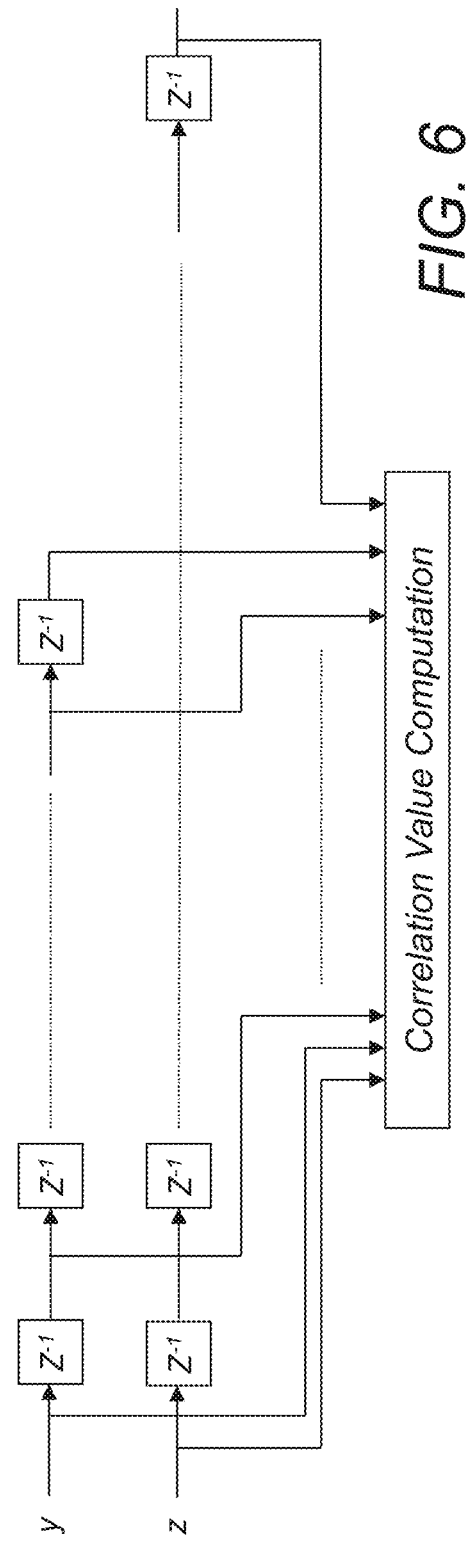
FIG. 6 illustrates a tapped delay line utilized to calculate various rate correlations in accordance with embodiments of the invention.

In a number of embodiments, the initial step in performing the correlation is to accumulate FM0 data-0 or data-1 symbols (i.e. 12 samples with a transition in the middle or without a transition). A circuit that can be utilized to accumulate FM0 data-0 and data-1 symbols in accordance with embodiments of the invention is illustrated in FIG. 5. The first part of the circuit computes the half symbol accumulations and the latter part uses the half symbol accumulations to generate a zero or a one accumulation. The y output is capable of generating either data-0 or data-1s depending on the sign of the operand, and the z output generates data-0s only. A circuit for computing different correlation values by summing different delayed versions of the y and z outputs in accordance with embodiments of the invention is illustrated in FIG. 6. The y and z outputs simply enter a long chain of shift registers from which different taps are taken. The taps that are taken to determine the correlation at a specific data rate are a function of the modulation type and skipping pattern for the particular rate. Depending upon the modulation type, some taps are negated (to obtain an inverse data-0 or a data-1) or are reset (to discard taps that are not needed). The resulting values can be summed using any of a variety of techniques to obtain the correlation at each of the rates. As discussed above, the correlations can then be utilized to determine the best starting sample and rate and the beamforming coefficients utilized to combine the data from each of the antenna elements.

Performing Joint Beamforming and Preamble Detection

Figure 7:
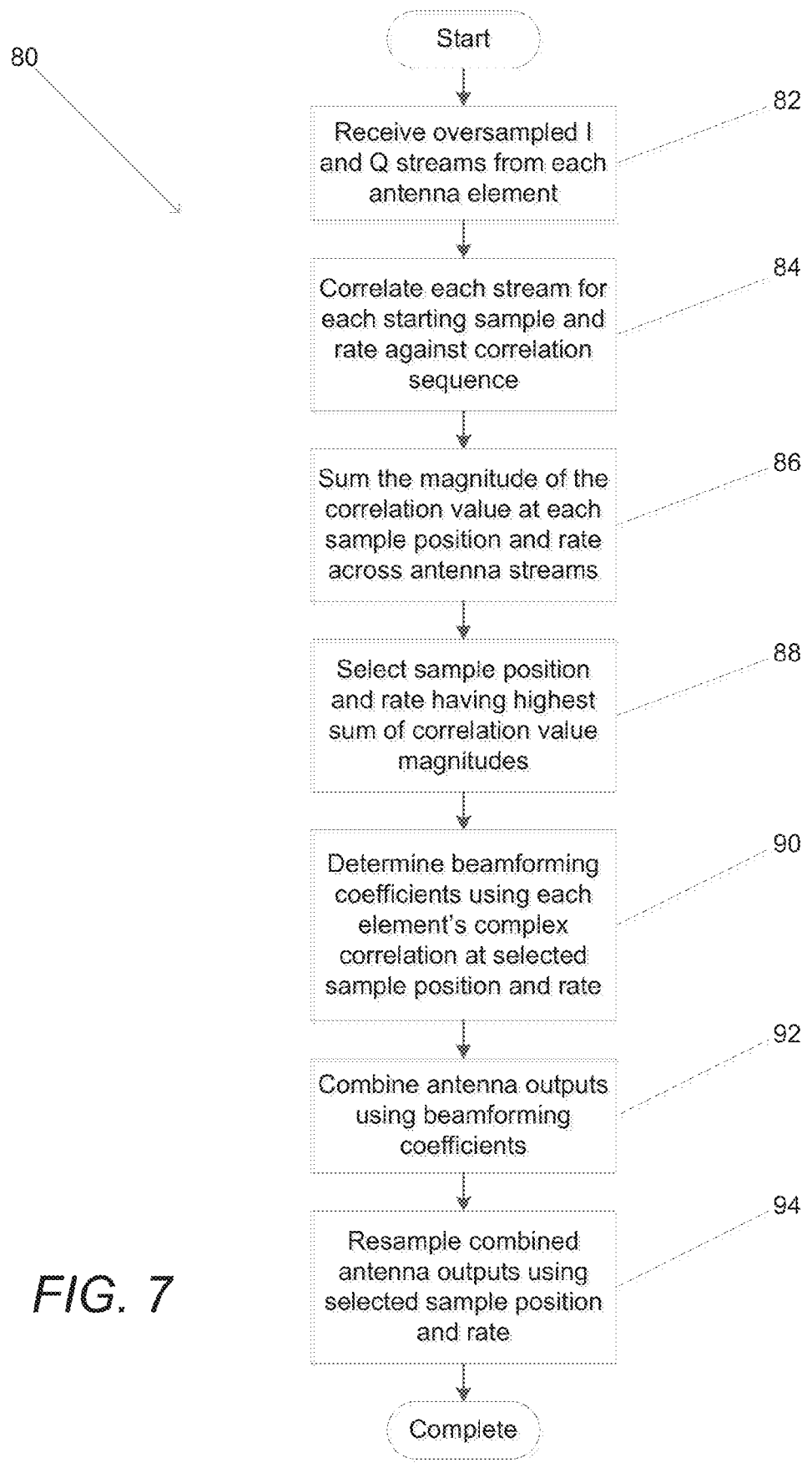
FIG. 7 is a flow chart illustrating a process for performing joint beamforming and preamble detection in accordance with embodiments of the invention.

Although specific RFID reader systems are discussed above processes for performing joint beamforming and preamble detection in accordance with embodiments of the invention can be implemented using a variety of hardware configurations. A process for performing joint beamforming and preamble detection in accordance with an embodiment of the invention is illustrated in FIG. 7. The process 80 involves receiving (82) oversampled I and Q streams from each of the antenna elements in an antenna array. Each of the streams is correlated (84) against a correlation sequence for a plurality of potential starting samples and predetermined data rates. The magnitudes of the resulting correlations are summed (86) across each of the streams for each starting sample position and data rate. The starting sample position and data rate with the highest sum is selected (88) as the best starting sample and data rate for decoding the received data. The correlations for each of the streams at the selected starting sample and data rate can be used to determine (90) beamforming coefficients for combining (92) the complex outputs of each of the antenna elements. In a number of embodiments the beamforming coefficient is determined as the ratio of the complex correlation of a particular antenna element relative to the maximum complex correlation across all of the antenna elements at the selected starting sample and data rate. Once the complex outputs of the antenna elements have been combined using the beamforming coefficients, the combined output can be resampled (94) using the selected starting sample position and data rate. At which point the joint beamforming and preamble detection is complete and the resampled signal can be provided to a decoder for decoding.

Although a specific joint beamforming and decoding process in accordance with embodiments of the invention is illustrated in FIG. 7, any of a variety of processes involving using a single correlation process to both identify the best starting sample and data rate for decoding the received data and the beamforming coefficients that can be used to combine the complex antenna outputs can be utilized in accordance with embodiments of the invention.

While the above description contains many specific embodiments of the invention, these should not be construed as limitations on the scope of the invention, but rather as an example of one embodiment thereof. Accordingly, the scope of the invention should be determined not by the embodiments illustrated, but by the appended claims and their equivalents.

What is claimed:

1. A method of detecting transmitted data from a Radio Frequency Identification (RFID) tag using an RFID receiver, the method comprising:
   receiving sampled antenna streams from each of a plurality of antenna elements in an antenna array using the RFID receiver comprising the antenna array and a joint beamformer and preamble detector;
   generating correlation values by correlating each of the sampled antenna streams against a predetermined correlation sequence for each of a plurality of different possible starting sample positions at a plurality of different predetermined rates using the joint beamformer and preamble detector;
   summing magnitudes of the correlation values of each of the sample positions and rates across each of the sampled antenna streams using the joint beamformer and preamble detector;
   selecting the sample position and rate having a highest sum of the correlation value magnitudes using the joint beamformer and preamble detector;
   determining beamforming coefficients based on the correlation values of each of the sampled antenna streams at the selected sample position and rate using the joint beamformer and preamble detector;
   combining the sampled antenna streams based upon the determined beamforming coefficients using the joint beamformer and preamble detector;
   resampling the combined sampled antenna streams based upon the selected starting sample position and rate using the joint beamformer and preamble detector to produce a resampled signal; and
   decoding the transmitted data based upon the resampled signal using the RFID receiver.

2. The method of claim 1, wherein the sampled antenna streams from the plurality of antenna elements are correlated against the predetermined correlation sequence at the plurality of different starting sample positions and the plurality of different predetermined rates using a skipping based correlator.

3. The method of claim 2, wherein:
   the skipping based correlator further comprises a symbol accumulator circuit and a tapped delay line; and
   the correlation values for the different starting sample positions and rates are determined using outputs of different taps from the tapped delay line.

4. The method of claim 1, wherein the sampled antenna streams from each of the plurality of antenna elements are complex and comprises samples of in-phase and quadrature channels of each of the sampled antenna streams.

5. The method of claim 4, wherein the correlation values are complex correlation values and the beamforming coefficients are complex beamforming coefficients.

6. The method of claim 5, wherein $b_i$ is a complex beamforming coefficient of the complex beamforming coefficients, the complex beamforming coefficient $b_i$ is for antenna element i of the antenna array having n antenna elements in the plurality of antenna elements, and $b_i$ is generated as follows:

$$b_i = \frac{c_i}{\max|c_o, \ldots, c_{n-1}|}$$

where $c_i$ is the complex correlation value of the sampled antenna stream from said antenna element i at the selected starting sample position and rate.

7. The method of claim 1, further comprising the RFID receiver requesting data from the RFID tag using FM0 modulated pilot and preamble symbols.

8. The method of claim 7, wherein the predetermined correlation sequence includes 12 pilot symbols and 6 preamble symbols of the FM0 modulated pilot and preamble symbols.

9. The method of claim 1, further comprising the RFID receiver requesting data from the RFID tag using Miller-2 modulated pilot and preamble symbols.

10. The method of claim 9, wherein the predetermined correlation sequence corresponds to 20 FM0 symbols of the Miller-2 modulated pilot and preamble symbols.

11. The method of claim 1, further comprising the RFID receiver requesting data from the RFID tag using Miller-4 modulated pilot and preamble symbols.

12. The method of claim 11, wherein the predetermined correlation sequence corresponds to 40 FM0 symbols of the Miller-4 modulated pilot and preamble symbols.

13. The method of claim 1, further comprising the RFID receiver requesting data from the RFID tag using Miller-8 modulated pilot and preamble symbols.

14. The method of claim 13, wherein the predetermined correlation sequence corresponds to 48 FM0 symbols of the Miller-8 modulated pilot and preamble symbols.

* * * * *